United States Patent
Thakur et al.

(10) Patent No.: US 8,554,769 B1
(45) Date of Patent: Oct. 8, 2013

(54) IDENTIFYING GIBBERISH CONTENT IN RESOURCES

(75) Inventors: Shashidhar A. Thakur, Santa Clara, CA (US); Sushrut Karanjkar, Fremont, CA (US); Pavel Levin, Toronto (CA); Thorsten Brants, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 708 days.

(21) Appl. No.: 12/486,626

(22) Filed: Jun. 17, 2009

Related U.S. Application Data

(60) Provisional application No. 61/073,346, filed on Jun. 17, 2008.

(51) Int. Cl.
*G06F 17/30* (2006.01)

(52) U.S. Cl.
USPC .......................................... 707/735

(58) Field of Classification Search
None
See application file for complete search history.

(56) References Cited

U.S. PATENT DOCUMENTS

| | | | |
|---|---|---|---|
| 7,962,510 B2 * | 6/2011 | Najork et al. | 707/771 |
| 2006/0184500 A1 * | 8/2006 | Najork et al. | 707/1 |
| 2008/0082528 A1 * | 4/2008 | Bonzi et al. | 707/5 |

OTHER PUBLICATIONS

Brants, T., et al., "Large Language Models in Machine Translation," Proceedings of the 2007 Joint Conference on Empirical Methods in Natural Language Processing and Computational Natural Language Learning, [Online] Jun. 28-30, 2007, pp. 858-867. Retrieved from the Internet. URL: http://acl.ldc.upenn.edu/D/D07/D07-1090.pdf [retrieved on Nov. 12, 2008], 10 pgs.

Chen, S.F., et al., "An Empirical Study of Smoothing Techniques for Language Modeling", Technical Report, TR-10-98, Computer Science Group, Harvard University, Cambridge, MA, 1998, 63 pgs.

* cited by examiner

*Primary Examiner* — Dinku Gebresenbet

(74) *Attorney, Agent, or Firm* — Fish & Richardson P.C.

(57) ABSTRACT

This specification describes technologies relating to providing search results. One aspect of the subject matter described in this specification can be embodied in methods that include the actions of receiving a network resource, the network resource including text content; generating a language model score for the resource including applying a language model to the text content of the resource; generating a query stuffing score for the reference, the query stuffing score being a function of term frequency in the resource content and a query index; calculating a gibberish score for the resource using the language model score and the query stuffing score; and using the calculated gibberish score to determine whether to modify a ranking score of the resource.

21 Claims, 4 Drawing Sheets

IDENTIFYING GIBBERISH CONTENT IN RESOURCES

CROSS-REFERENCE TO RELATED APPLICATIONS

This application claims the benefit under 35 U.S.C. §119(e) of U.S. Provisional Patent Application Ser. No. 61/073,346, filed on Jun. 17, 2008.

BACKGROUND

This specification relates to providing search results.

Search engines—and, in particular, Internet search engines—aim to identify resources (e.g., web pages, images, text documents, processes, multimedia content) that are relevant to a user's needs and to present information about the resources in a manner that is most useful to the user. In response to a query submitted by a user, search engines return search results referring to resources identified as relevant to or matching the query.

Spammers typically generate gibberish content such that the search engine returns an identification of resources associated with the gibberish content as relevant to the submitted query. Gibberish content refers to resource content that is likely to represent spam content. For example, gibberish content can include text sequences that are unlikely, based on specified criteria, to represent natural language text strings (e.g., conversational syntax) or to represent text strings that, while not structured in conversational syntax, typically occur in resources (e.g., in web documents). For example, a spammer can generate as gibberish content a web page that includes a number of high value keywords such that the search engine will identify the web page as highly relevant. The gibberish resources can be generated in a number of ways. For example, using low-cost untrained labor, scraping content and modifying and splicing it randomly, and translating from a different language.

The spammer can generate revenue from the traffic to the gibberish web page by including, for example, advertisements, pay-per-click links, and affiliate programs. Moreover, since the gibberish web page was generated using high value keywords without context, the web page typically does not provide any useful information to a user.

SUMMARY

This specification describes technologies relating to providing search results.

In general, one aspect of the subject matter described in this specification can be embodied in methods that include the actions of receiving a network resource, the network resource including text content; generating a language model score for the resource including applying a language model to the text content of the resource; generating a query stuffing score for the reference, the query stuffing score being a function of term frequency in the resource content and a query index; calculating a gibberish score for the resource using the language model score and the query stuffing score; and using the calculated gibberish score to determine whether to modify a ranking score of the resource. Other embodiments of this aspect include corresponding systems, apparatus, and computer program products.

These and other embodiments can optionally include one or more of the following features. Generating the language model score further includes parsing the text content of the resource into one or more text segments; applying the language model to each text segment to generate a corresponding segment score; and generating the language model score as a function of the segment scores. Applying the language model to each text segment to generate a corresponding segment score further includes for each text segment of the one or more text segments, using the language model to determine a likelihood of a sequence of words forming the text segment occurring; normalizing the calculated likelihood for each text segment to generate the corresponding text segment score; and determining whether the text segment includes gibberish content based on whether the text segment score exceeds a specified threshold.

Generating the language model score further includes calculating a fraction of terms identified as gibberish to a total number of terms in the text content; calculating a sum of text segment scores corresponding to text segments identified as having gibberish content; and determining the language model score as a function of the calculated fraction of terms and sum of text segment scores. Generating the query stuffing score further includes identifying a query index, the query index including multiple queries, each query of the multiple queries being keyed to one or more terms found in the respective query such that the query index identifies, for each key, one or more queries containing the key; identifying one or more most frequent terms in the text content of the resource; determining whether one or more phrases in the text content containing one frequent term of the one or more most frequent terms corresponds to a query in the query index having a key corresponding to the one most frequent term; calculating, for each of the one or more most frequent terms, a fraction of queries in the query index associated with a particular key match a phrase in the text content; and calculating the query stuffing score as a function of an average of the fractions calculated for each of the one or more most frequent terms and a maximum fraction calculated for the one or more most frequent terms.

Calculating the gibberish score for the resource includes calculating a minimum score of the language model score and the query stuffing score. Using the gibberish score includes removing the resource from the ranking when the gibberish score is less than or equal to a first threshold value; weighting the ranking score of the resource when the gibberish score is greater than the first threshold value but less than a second threshold value including applying a particular weight to the resource; and leaving the ranking score of the resource unchanged when the gibberish score is greater than or equal to the second threshold.

In general, one aspect of the subject matter described in this specification can be embodied in methods that include the actions of receiving a network resource, the network resource including text content; generating a language model score for the resource including applying a language model to the text content of the resource, including parsing the text content of the resource into one or more text segments, applying the language model to each text segment to generate a corresponding segment score, and generating the language model score as a function of the segment scores; and using the calculated language model score to determine whether to modify a ranking score of the resource. Other embodiments of this aspect include corresponding systems, apparatus, and computer program products.

These and other embodiments can optionally include one or more of the following features. Applying the language model to each text segment to generate a corresponding segment score further includes for each text segment of the one or more text segments, using the language model to determine a likelihood of a sequence of words forming the text segment occurring; normalizing the calculated likelihood for each text segment to generate the corresponding text segment score; and determining whether the text segment includes gibberish content based on whether the text segment score exceeds a specified threshold. Generating the language model score further includes calculating a fraction of terms identified as gibberish to a total number of terms in the text content; calculating a sum of text segment scores corresponding to text segments identified as having gibberish content; and determining the language model score as a function of the calculated fraction of terms and sum of text segment scores.

In general, one aspect of the subject matter described in this specification can be embodied in methods that include the actions of receiving a network resource, the network resource including text content; generating a query stuffing score for the reference, the query stuffing score being a function of term frequency in the resource content and a query index, the query index including multiple queries, each query of the multiple queries being keyed to one or more terms found in the respective query such that the query index identifies, for each key, one or more queries containing the key; using the calculated query stuffing score to determine whether to modify a ranking score of the resource. Other embodiments of this aspect include corresponding systems, apparatus, and computer program products.

These and other embodiments can optionally include one or more of the following features. Generating the query stuffing score further includes identifying one or more most frequent terms in the text content of the resource; determining whether one or more phrases in the text content containing one frequent term of the one or more most frequent terms corresponds to a query in the query index having a key corresponding to the one most frequent term; calculating, for each of the one or more most frequent terms, a fraction of queries in the query index associated with a particular key match a phrase in the text content; and calculating the query stuffing score as a function of an average of the fractions calculated for each of the one or more most frequent terms and a maximum fraction calculated for the one or more most frequent terms.

Particular embodiments of the subject matter described in this specification can be implemented to realize one or more of the following advantages. Resources identified as having with gibberish content can be eliminated or demoted from search results, improving the search experience of the user. Removing or demoting resources identified as gibberish from search results reduces the ability of spammers to receive revenue from generated gibberish content.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
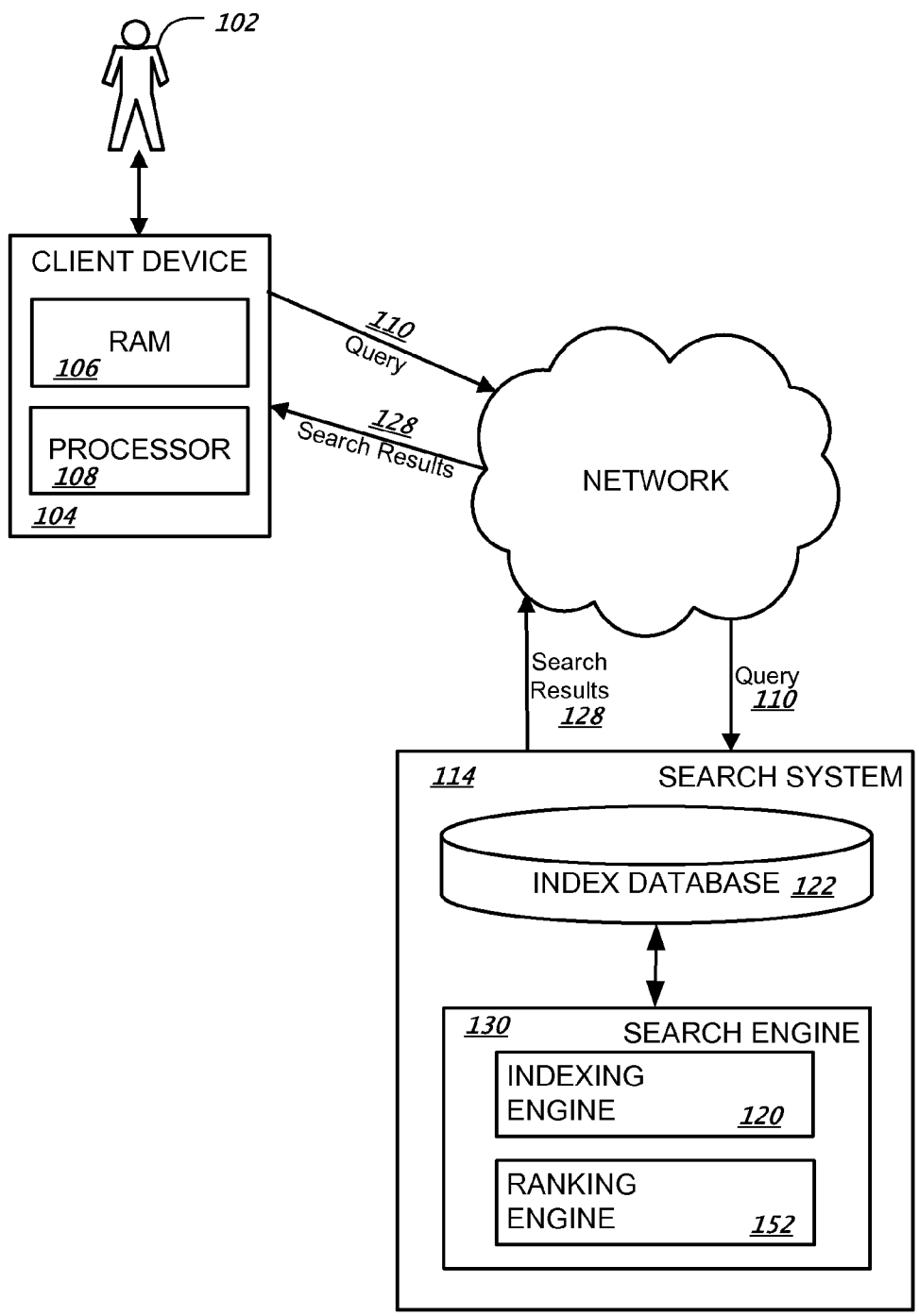
FIG. 1 shows an example search system.

FIG. 1 shows an example search system 114 that can be used to provide search results relevant to submitted search queries as can be implemented in an Internet, an intranet, or another client and server environment. The search system 114 is an example of an information retrieval system in which the systems, components, and techniques described below can be implemented.

A user 102 can interact with the search system 114 through a client device 104 (e.g., a personal computer, a mobile telephone, a personal digital assistant, a mobile audio or video player, a game console, or a combination of one or more of them). For example, the client 104 can be a computer coupled to the search system 114 through a local area network (LAN), e.g., an enterprise intranet, or a wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can connect to a search engine 130 within a search system 114 to submit a query 110. When the user 102 submits a query 110, the query 110 is transmitted through one or more wired or wireless networks to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies relevant resources (i.e., resources matching or satisfying the query 110). The search engine 130 will generally include an indexing engine 120 that indexes resources (e.g., web pages, images, or news articles on the Internet), and stores index information for the resources in an index database 122. This index database 122 is used to identify resources that match the query 110.

The search engine 130 will generally include a ranking engine 152 (or other software) that ranks the resources related to the user query 110. The ranking of resources can be performed using conventional techniques, e.g., for determining an information retrieval score for indexed resources in view of a given query. The relevance of a particular resource with respect to a particular query term or to other provided information may be determined by any appropriate technique. The search engine 130 can transmit the search results 128 identifying particular resources through the network to the client device 104 for presentation to the user 102.

Figure 2:
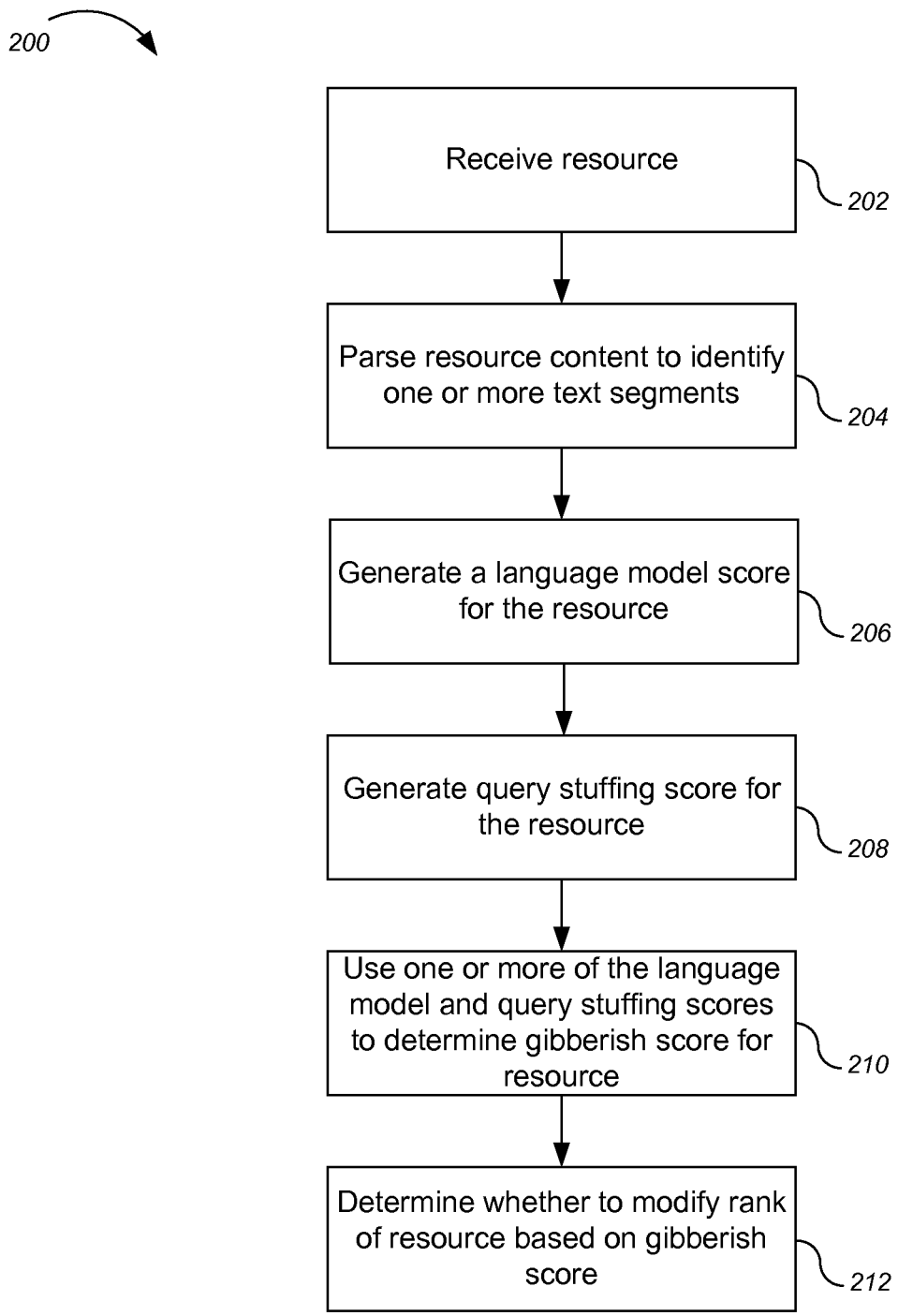
FIG. 2 shows an example process for detecting resources having gibberish content.

FIG. 2 shows an example process 200 for detecting resources having gibberish content. For convenience, the process 200 will be described with respect to a system that performs the process 200 (e.g., search system 114).

The system receives 202 a resource. The received resource can be one of a collection of resources identified by the system. For example, the resources can be as part of an indexing operation performed by a search engine searching a collection of resources. The resource includes text content. For example, the resource can be a web page including text, images, and other content.

The system parses 204 the text content of the resource to identify one or more text segments. A text segment is a sequence of terms (e.g., words, phrases, punctuation). Each text segment can be, for example, a page, a paragraph, a sentence, or another string or strings of text. In addition to the text content, the resource can also include a number of HTML tags. The HTML tags provide, for example, formatting information for rendering the resource content (e.g., web page content and layout). For example, the HTML tags include tags identifying headings, paragraphs, line breaks which are read by a browser when rendering the resource content. The following example includes a number of tags including a heading tag <h1> and paragraph tags <p>:

<html>
<body>
<h1>Heading text</h1>
<p>First paragraph text. Sentence 1. Sentence 2. Sentence 3. </p>
<p>Second paragraph text. Sentence 4. Sentence 5. Sentence 6. </p>
</body>
</html>

A browser uses the tags to display the text portion as:
Heading text
First paragraph text. Sentence 1. Sentence 2. Sentence 3.
Second paragraph text. Sentence 4. Sentence 5. Sentence 6.

Thus, the system can use the HTML tags to parse the resource content into text segments corresponding to one more tag types, for example, as a sequence of paragraphs using paragraph tags. The system can also use the HTML tags to identify short sequences of text. For example, small paragraphs (e.g., paragraphs having short lengths) identified by HTML tags can indicate small fragments of text such as menu items, which can be removed or otherwise ignored.

Additionally, an HTML parser can then be used to remove the HTML tags from the text content. Thus, the system can analyze a sequence of text segments without the non-text elements (e.g., analyzing the resource content as it would appear when displayed by a browser). In some implementations, the system further filters the text content. For example, the system can eliminate particular sequences of proper nouns (e.g., names, geographic locations). These types of sequences often represent lists rather than natural language text.

The system generates 206 a language model score for the resource using the parsed text segments. The language model score uses a language model to determine a likelihood that the text including natural language sequences rather than gibberish content.

Figure 3:
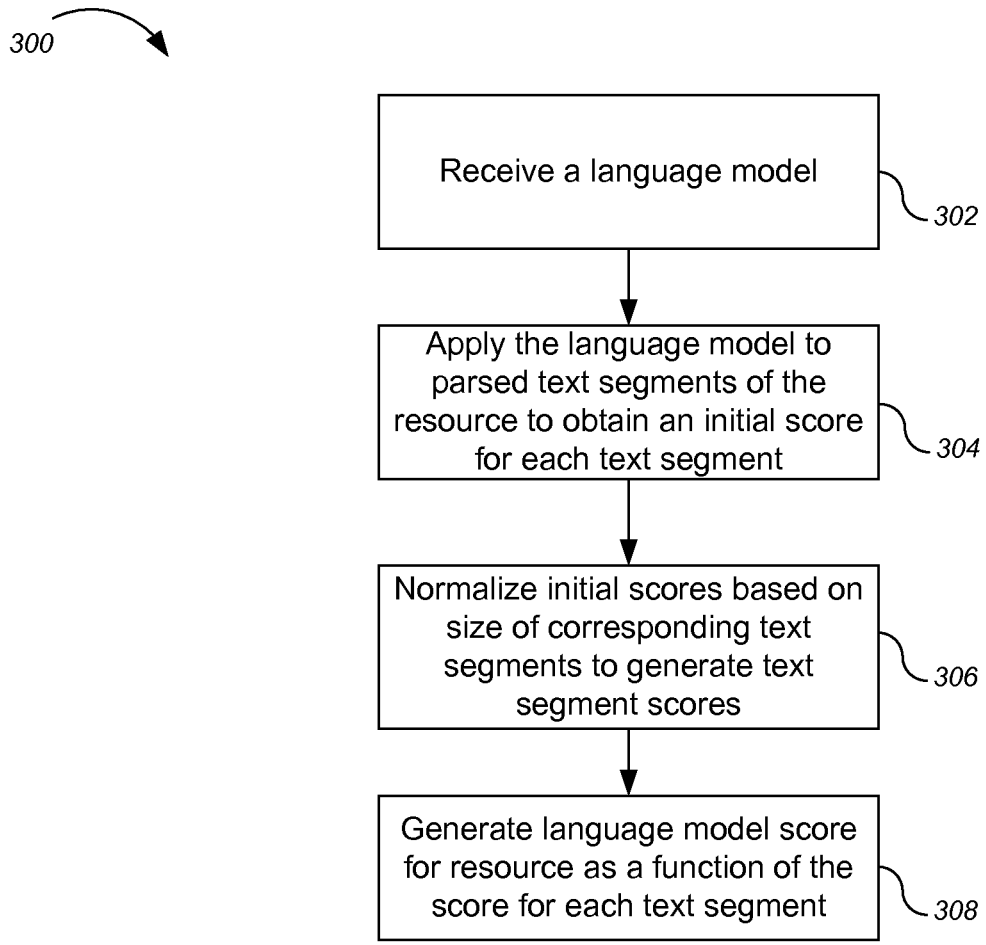
FIG. 3 shows an example process for generating a language model score for a resource.

FIG. 3 shows an example process 300 for generating a language model score for a resource. For convenience, the process 300 will be described with respect to a system that performs the process 300.

The system identifies 302 a language model corresponding to a language of the text segments. In some implementations, the system identifies multiple language models for text segments of different languages or individual text segments having one or more languages. The system can identify the language model, for example, from a collection of language models. Alternatively, the system can identify the language model as a previously generated language model. The language model can be a statistical model that identifies a likelihood (i.e., probability) that a term occurring in the context of a sequence of a specified number of other terms occurring before it in the text segment. For example, for a sentence "the black sheep" the language model can be used to determine the likelihood that "sheep" follows "the black".

Language models are used to model a probability that a string of words in a given vocabulary will appear in a language. For example, language models are used in automatic speech recognition, machine translation, and optical character recognition applications. Modeling the probability for a string of words in the vocabulary is typically performed using a chain rule and calculating the probability of a given word, w, in a given string context, p(w|context), where the context is the words in the string preceding the given word, w.

In an n-gram language model, the words in the vocabulary are formed into n-grams. An n-gram is a sequence of n consecutive words. An n-gram has an order, which is the number of words in the n-gram. For example, a 1-gram (or unigram) includes one word; a 2-gram (or bi-gram) includes two words. In some implementations, a 5-gram language model is used by the system to generate scores for text segments.

A given n-gram can be described according to different portions of the n-gram. An n-gram can be described as a context and a future word, (context, w), where the context has a length n−1 and w represents the future word. For example, the 3-gram "the black sheep" can be described in terms of an n-gram context and a future word. The n-gram context includes all words of the n-gram preceding the last word of the n-gram. In the given example, "the black" is the context.

The probability according to the n-gram language model that a particular string will occur can be determined, e.g., using the chain rule. The chain rule determines a probability of a string as a product of individual probabilities. Thus for a given string "$e_1, e_2, \ldots, e_k$", the probability for the string, $p(e_1, e_2, \ldots e_k)$, is equal to:

$$\prod_{i=1}^{k} p(e_i | e_1, \ldots, e_{i-1})$$

The system applies 304 the language model to the parsed text segments of the resource. In particular, the system initially scores each text segment using the language model. The system applies the language model to determine a likelihood that the sequence of words in the text segment corresponds to natural language text. For example, a higher overall likelihood means it is more likely that the text segment is real content rather than gibberish content.

In some implementations, the paragraph is broken into a number of smaller text segments, e.g., sentences. The probabilities can be combined in order to determine a score for the paragraph as a whole. For example, for a text segment corresponding to a paragraph having one or more sentences, the system can calculate a likelihood for each sentence using the language model. The likelihood for the paragraph can then be calculated by combining the probabilities of the individual sentences. For example, the system can sum the probabilities for each sentence and then divide by the number of sentences in the paragraph to generate a score for the paragraph as a whole.

Alternatively, the system can treat the entire paragraph as a single text segment (e.g., as a single string of text). The system calculates the likelihood of the text as a product of a string of probabilities according the size of the n-grams used in the language model used. The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope)=p(NASA)×p(officials|NASA)×p(say|NASA officials)×p(they|officials say)×p(hope|say they). This can be generalized to:

$$p(e_1, \ldots, e_k) = \prod_{i=1}^{k} p(e_i \mid e_{i-n+1}, \ldots, e_{i-1})$$

where n is the order of the largest n-gram allowed in the language model.

The conditional probabilities are generally determined empirically, according to relative frequencies in a collection of training data. For example, in the example above, the probability of the word "say" given the context of "NASA officials" is given by:

$$p(\text{say} \mid NASA \text{ officials}) = \frac{f(NASA \text{ officials say})}{f(NASA \text{ officials})},$$

where f (NASA officials say) is a frequency or a count of the occurrences of the string "NASA officials say" in the collection of training data. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say".

Additionally, in some implementations, language models include a smoothing technique (e.g., using back off weights), for estimating n-gram probabilities when there is sparse training data for the particular n-gram.

Thus, the system generates, for each text segment, an initial score based on the determined likelihood for that text segment.

The system normalizes 306 the initial scores to produce a text segment score based on the size of the text segment since the text segments can be of different sizes (e.g., different paragraph lengths). For example, the system can divide the initial scores by the corresponding paragraph length in order to normalize each paragraph. If the resulting text segment score is greater than a threshold value, the text segment is identified as containing gibberish content. In some alternative implementations, the system does not normalize the scores. For example, if the text segments are chosen such that the length of each text segment is within a specified size range, normalization may not be necessary.

The system generates 308 a language model score for the resource as a function of the scores calculated for each text segment. In particular, a resource R includes a number of text segments S={$s_1, s_2, \ldots, s_j$}, where each text segment has a score, score {$s_i$}, calculated using the language model. Whether or not each text segment is classified as gibberish is a function of the score such that a gibberish score for the text segment can be expressed as gibb$_i$=f(score($s_i$)). For example, if f(score($s_i$)) results in a value that is below a threshold, then the text segment is classified as gibberish. In particular, if the system classifies a text segment as gibberish, then all of the terms in the text segment |$T_i$| contribute toward the volume of gibberish in the text content of a resource having a total number of terms $T_R$.

The overall language model score (e.g., a gibberish score for the resource based on the language model analysis) is a function of the fraction of gibberish terms to the number of terms in the resource and the total number of scores identifying gibberish text segments, represented by:

$$LM \text{ score} = f\left(\left(\frac{\sum_{i \in gibb_R} |T_i|}{T_R}\right), \left(\sum_{i \in gibb_R} \text{score}(s_i)\right)\right).$$

Where gibb$_R$ represents a set of all gibberish paragraphs of the resource. In some implementations, a product of the two functions is used where each function is monotonic:

$$LM \text{ score} = f\left(\frac{\sum_{i \in gibb_R} |T_i|}{T_R}\right) f\left(\sum_{i \in gibb_R} \text{score}(s_i)\right).$$

As shown in FIG. 2, the system generates 208 a query stuffing score for the resource. The query stuffing score provides another measure for determining whether the text content of the resource is gibberish content. In particular, the system can identify whether text content of a resource contains a number of queries such that the text content is unlikely to include natural language text strings.

Figure 4:
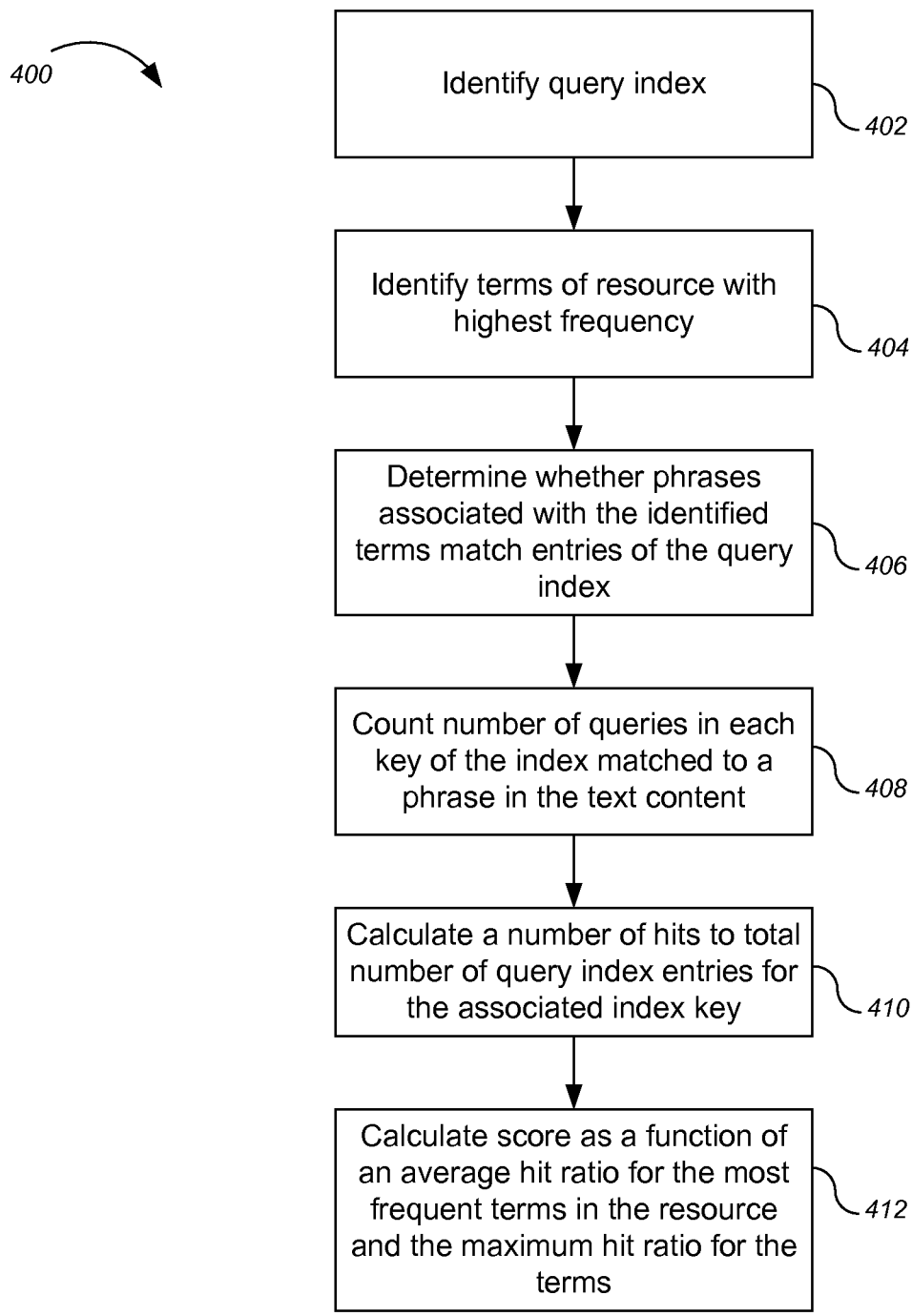
FIG. 4 shows an example process for generating a query stuffing score for a resource.

FIG. 4 shows an example process 400 for generating a query stuffing score. For convenience, the process 400 will be described with respect to a system that performs the process 400.

The system identifies 402 a query index. In some implementations, the system generates the identified query index. Alternatively, in some other implementations, the system receives the query index. The system can receive the query index locally or remotely. For example, the system can retrieve a query index generated at an earlier time such that the query index can be retrieved when scoring resources.

Generating the query index includes identifying a collection of user queries. For example, the system can retrieve the collection of user queries from a query log identifying queries from a group of users over a specified period of time (e.g., a month). In some implementations, the system filters the collection of user queries to remove particular queries, e.g., particular common queries, punctuation, URL's and other strings that do not correspond to natural language sequences.

The system indexes the collection of queries. The index includes index keys and queries. Specifically, each index key is a term and the associated queries are queries that include the term. The index keys can include all unique terms from the collection of queries. In some implementations, the queries are filtered to remove particular terms from the queries, e.g., stop words, very common words, and very rare terms. An example portion of a query index is shown in Table 1.

TABLE 1

| Index Key | Queries |
| --- | --- |
| Cat | Cat |
|  | Cat food |
|  | Tabby cat |
|  | Cat show breeds |
|  | How to wash a cat |
|  | Funny cat photos |
| Food | Cat food |

TABLE 1-continued

| Index Key | Queries |
|---|---|
| | Dog food |
| | Food nutrition information |
| | Organic food restaurants |
| Lamp | Lamp shades |
| | Where to buy a lamp |
| | Cool lamp stores |
| . | . |
| . | . |
| . | . |

Table 1 shows index keys "cat", "food", and "lamp". Each index key corresponds to a term found in each of the queries associated with the index key. For example, the index key "cat" is associated with queries "cat", "cat food", "tabby cat", "cat show breeds", "how to wash a cat" and "funny cat photos". In implementations where the queries are filtered, for example to remove stopwords, queries such as "how to wash a cat" can be presented as "how wash cat". Additionally, a particular query can be associated with more than one index key. For example, the query "cat food" is associated with both the index key "cat" and the index key "food".

The system identifies 404 one or more terms in the text content of the resource based on their frequency in the text content. For example, the system can identify one or more terms that occur frequently without considering particular filtered terms e.g., stopwords, very common terms, or very rare terms. In some implementations, the system identifies the two most frequent, non-filtered, terms in the text content of the resource.

The system determines 406 whether phrases in the text content of the resource associated with the identified terms match entries of the query index. For example, if the term "foo" is the most frequent term in the text content of the resource, the system examines each occurrence of the term with respect to the surrounding words. The following represents a sequence of terms including the most frequent term "foo":

_ _foo_ _ _ _foo_ _ _foo_ _ _ _foo_ _ _

Where each "_" represents an individual term in the text content. Additionally, in some implementations, the text content is parsed to filter the text content e.g., to remove stopwords, very common terms, and very rare terms similar to the filtering performed on the queries in the query index.

Additionally, the query index includes the key "foo" having one or more associated queries. For example, the queries in the index for the key "foo" can include "a foo", "a foo b", and "foo c d" where a, b, c, and d, each represent distinct terms. For each instance of the term in the text content, the system searches for the queries associated with the index key corresponding to the term. In particular, the system searches for queries based on the terms surrounding the instances of that term in the text content of the resource. Thus, for each instance of "foo" above, the system searches for "a foo", "a foo b", and "foo c d" based on the surrounding terms. The process is repeated for any other frequent term identified by the system. In some implementations, two most frequent terms are used.

The system counts 408 the number of queries, for a key corresponding to one of the frequent terms identified, matched to a phrase in the text content of the resource. Each match is referred to as a "hit". For example, the text content of the resource can include phrases matching the queries "a foo b" and "a foo". However, other queries associated with the key "foo" in the index may not have matches. For example, the query "foo c d" may not have a matching phrase in the text content.

The system calculates 410 the fraction of queries hit relative to a total number of queries for a particular index key. For example, if a particular key is associated with twenty queries, five of which matched phrases in the text content, then ¼ of the queries were hit for that key. The more queries identified of all possible queries for the key, the more likely that the text content has been stuffed with queries because many of the queries would be unlikely to occur together in the text content of a single resource.

The system calculates 412 a query stuffing score as a function of an average hits with respect to the number of queries in the key for the frequent terms and a maximum of hits with respect to the number of queries in the key for the frequent terms. For example, for a particular text content, the system can identify two most frequent terms, e.g., $T_1$ and $T_2$. For each term, the system identifies a corresponding number of queries matching phrases of the text content including the term, e.g., $L_1$ for term $T_1$ and $L_2$ for term $T_2$. The system calculates a fraction of the number of queries with respect to the total number of queries for the index key corresponding to each term, e.g., $S_1$ for term $T_1$ and $S_2$ for term $T_2$, which can be represented as:

$$S_1 = \frac{L_1}{|\text{index}(T_1)|} \text{ and } S_2 = \frac{L_2}{|\text{index}(T_2)|}, \text{respectively.}$$

The query stuffing score for the resource is then calculated as a function of two measures, the average of $S_1$ and $S_2$ and the maximum of $S_1$ and $S_2$, which for two terms is represented as:

$$\text{query stuffing score} = f\left(\frac{S_1 + S_2}{2}, \max(S_1, S_2)\right).$$

In some implementations, different numbers of frequent terms are used and the calculation of the query stuffing score is adjusted accordingly. For example, if three terms are used, the average becomes $(S_1+S_2+S_3)/3$ and the maximum is the largest of $S_1$, $S_2$, and $S_3$. Alternatively, if only one term is used, the query stuffing score is simply $S_1$ since the average and maximum would be identical.

In some implementations, the functions weight one measure over another such that the query stuffing score is primarily based on either the average or the maximum. For example, the product of the two functions can be taken, where each is a monotomic function, represented as:

$$\text{query stuffing score} = f\left(\frac{S_1 + S_2}{2}\right) f(\max(S_1, S_2))$$

As shown in FIG. 2, the system uses 210 one or more of the language model score and the query stuffing score to determine a gibberish score for the resource. In some implementations, the system compares the language model score and query stuffing score to determine the gibberish score for the resource. For example, the system can select the minimum score of the language model score and the query stuffing score as the gibberish score for the resource. In another implementation, the language model score is used to boost the query stuffing score, for example, when the language model score alone does not exceed a threshold level.

In another implementation, the language model score is used as the gibberish score for the resource without need for determining the query stuffing score for the resource. Similarly, in an alternative implementation, the query stuffing score is used as the gibberish score for the resource without need for determining the language model score for the resource.

The system determines 212 whether to modify a ranking score of the resource based on the gibberish score. For example, when a query is received by a search engine, the search engine identifies resources responsive to the query (e.g., using a recourse index as described with respect to FIG. 1). The identified resources are ranked relative to each other based on one or more ranking scores for each resource. The resources are then presented to the user (e.g., as part of search results identifying the resources presented in the search interface of the browser) according to that ranking. The ranking score for each resource can include e.g., an information retrieval score. Different weights or scoring parameters can be used to adjust the ranking score for a particular resource according to different factors.

Specifically, with respect to the determined gibberish score for a resource, whether the system modifies the ranking score can depend on the gibberish score relative particular thresholds. For example, the system can remove the resource as a candidate for search results altogether when the gibberish score is less than a first threshold. In some implementations, the system removes the resource identifier from the index or, alternatively, moves the resource identifier to a lower tier index. Alternatively, the system can tag the resource as unavailable. In some other implementations, a weight is applied such that the resource is effectively removed from being ranked (e.g., a very large weight).

In some implementations, even if the resource is effectively removed from ranking, the resource can be returned under particular circumstances. For example, a gibberish score filtering can be applied which disables weighting of gibberish documents for URL and site queries, so those are unaffected as a whole. For example, if the received query is a URL corresponding to the resource, then the search result for the resource is always returned even if the resource has a gibberish score that is less than the first threshold.

If the gibberish score is greater than or equal to the first threshold, but less than a second threshold, the system can weight the ranking score to demote the position that the resource would otherwise have. The weight applied can vary depending on the gibberish score such that some resources can potentially be demoted more than others. For example, the system can determine the weight by multiplying the previous ranking score of the resource by a factor in inverse proportion to the gibberish score. Additionally, the degree of demotion relative to a group of resources depends on the ranking scores of the other resources identified in response to a query.

If the gibberish score is greater than or equal to the second threshold, the system determines that the ranking score should be unmodified by the gibberish score. Thus, if the gibberish score is greater than the second threshold, the resources is not considered gibberish, or to not have sufficient gibberish content, to modify the ranking score of the resource.

As a result, the search system can include an index in which some indexed resources are removed from being provided as results to queries because of their calculated gibberish score while other indexed resources have an added weight that demotes the resource when being ranked among other resources in response to a received query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining a query index of a plurality of different queries submitted by a plurality of users to a search engine during a given time period, each query of the plurality of queries being keyed to one or more terms found in the respective query such that the query index identifies, for each key, one or more queries containing the key;
    obtaining a resource, the resource including text content;
    calculating a language model score for the resource including applying a language model to the text content of the resource;
    calculating a query stuffing score for the resource based on, at least, for a plurality of most frequently occurring terms in the text content of the resource that each match a respective key in the query index, a ratio of a count of queries in the index keyed to the term that appear in one or more phrases in the text content to a total count of queries in the index keyed to the term; and
    generating the query stuffing score based on an average of the calculated ratios;
    calculating a gibberish score for the resource based on the language model score and the query stuffing score; and
    determining whether to modify a ranking score of the resource based on the calculated gibberish score.

2. The method of claim 1, wherein calculating the language model score further comprises:
    parsing the text content of the resource into one or more text segments;
    applying the language model to each text segment to generate a respective segment score based on a likelihood of sequence of words forming the text segment occurring in a natural language; and
    generating the language model score based on the segment scores.

3. The method of claim 2, further comprising: for each text segment of the one or more text segments, determining that the text segment includes gibberish content when the text segment score exceeds a specified threshold.

4. The method of claim 3, wherein generating the language model score further comprises:

determining a gibberish term count as a sum of a count of terms in all text segments that include gibberish content;

calculating a ratio of the gibberish term count to the count of terms in the resource; and generating the language model score based on the respective segment scores and the ratio.

5. The method of claim 1, wherein calculating the gibberish score for the resource comprises calculating a minimum score of the language model score and the query stuffing score.

6. The method of claim 1, wherein using the gibberish score includes:

removing the resource from the ranking when the gibberish score is less than or equal to a first threshold value;

weighting the ranking score of the resource when the gibberish score is greater than the first threshold value but less than a second threshold value including applying a particular weight to the resource; and leaving the ranking score of the resource unchanged when the gibberish score is greater than or equal to the second threshold.

7. A non-transitory computer-readable storage medium having instructions stored thereon that, when executed by data processing apparatus, cause the data processing apparatus to perform operations comprising:

obtaining a query index of a plurality of different queries submitted by a plurality of users to a search engine during a given time period, each query of the plurality of queries being keyed to one or more terms found in the respective query such that the query index identifies, for each key, one or more queries containing the key;

obtaining a resource, the resource including text contents;

calculating a language model score for the resource including applying a language model to the text content of the resource;

calculating a query stuffing score for the resource based on, at least, for a plurality of most frequently occurring terms in the text content of the resource that each match a respective key in the query index, a ratio of a count of queries in the index keyed to the term that appear in one or more phrases in the text content to a total count of queries in the index keyed to the term; and generating the query stuffing score based on an average of the calculated ratios;

calculating a gibberish score for the resource based on the language model score and the query stuffing score; and determining whether to modify a ranking score of the resource based on the calculated gibberish score.

8. The non-transitory computer-readable storage medium of claim 7, where calculating the language model score further comprises:

parsing the text content of the resource into one or more text segments;

applying the language model to each text segment to generate a respective segment score based on a likelihood of a sequence of words forming the text segment occurring in a natural language; and generating the language model score based on the segment scores.

9. The non-transitory computer-readable storage medium of claim 8, further comprising:

for each text segment of the one or more text segments, determining that the text segment includes gibberish content when the text segment score exceeds a specified threshold.

10. The non-transitory computer-readable storage medium of claim 9, wherein generating the language model score further comprises:

determining a gibberish term count as a sum of a count of terms in all text segments that include gibberish content;

calculating a ratio of the gibberish term count to the count of terms in the resource; and generating the language model score based on the respective segment scores and the ratio.

11. The non-transitory computer-readable storage medium of claim 7, wherein calculating the gibberish score for the resource comprises calculating a minimum score of the language model score and the query stuffing score.

12. The non-transitory computer-readable storage medium of claim 7, wherein using the gibberish score includes:

removing the resource from the ranking when the gibberish score is less than or equal to a first threshold value;

weighting the ranking score of the resource when the gibberish score is greater than the first threshold value but less than a second threshold value including applying a particular weight to the resource; and leaving the ranking score of the resource unchanged when the gibberish score is greater than or equal to the second threshold.

13. A system comprising:

a memory and a processor configured to perform operations including:

obtaining a query index of a plurality of different queries submitted by a plurality of users to a search engine during a given time period, each query of the plurality of queries being keyed to one or more terms found in the respective query such that the query index identifies, for each key, one or more queries containing the key;

obtaining a resource, the resource including text contents;

calculating a language model score for the resource including applying a language model to the text content of the resource;

calculating a query stuffing score for the resource based on, at least, for a plurality of most frequently occurring terms in the text content of the resource that each match a respective key in the query index, a ratio of a count of queries in the index keyed to the term that appear in one or more phrases in the text content to a total count of queries in the index keyed to the term; and generating the query stuffing score based on an average of the calculated ratios;

calculating a gibberish score for the resource based on the language model score and the query stuffing score; and determining whether to modify a ranking score of the resource based on the calculated gibberish score.

14. The system of claim 13, wherein calculating the language model score further comprises:

parsing the text content of the resource into one or more text segments;

applying the language model to each text segment to generate a respective segment score based on a likelihood of a sequence of words forming the text segment occurring in a natural language; and generating the language model score based on the segment scores.

15. The system of claim 14, further comprising: for each text segment of the one or more text segments, determining that the text segment includes gibberish content when the text segment score exceeds a specified threshold.

16. The system of claim 15, wherein generating the language model score further comprises:

determining a gibberish term count as a sum of a count of terms in all text segments that include gibberish content;

calculating a ratio of the gibberish term count to the count of terms in the resource; and generating the language model score based on the respective segment scores and the ratio.

17. The system of claim 13, wherein calculating the gibberish score for the resource comprises calculating a minimum score of the language model score and the query stuffing score.

18. The system of claim 13, wherein where using the gibberish score includes:

removing the resource from the ranking when the gibberish score is less than or equal to a first threshold value;

weighting the ranking score of the resource when the gibberish score is greater than the first threshold value but less than a second threshold value including applying a particular weight to the resource; and leaving the ranking score of the resource unchanged when the gibberish score is greater than or equal to the second threshold.

19. The method of claim 2 wherein calculating the language model score further comprises:

normalizing each of the respective segment scores based on a length of the respective text segment; and generating the language model score as a function of the normalized segment scores.

20. The non-transitory computer-readable storage medium of claim 8 wherein calculating the language model score further comprises:

normalizing each of the respective segment scores based on a length of the respective text segment; and generating the language model score as a function of the normalized segment scores.

21. The system of claim 14 wherein calculating the language model score further comprises:

normalizing each of the respective segment scores based on a length of the respective text segment; and generating the language model score as a function of the normalized segment scores.

\* \* \* \* \*

UNITED STATES PATENT AND TRADEMARK OFFICE
CERTIFICATE OF CORRECTION

| | | |
|---|---|---|
| PATENT NO. | : 8,554,769 B1 | Page 1 of 1 |
| APPLICATION NO. | : 12/486626 | |
| DATED | : October 8, 2013 | |
| INVENTOR(S) | : Shashidhar A. Thakur et al. | |

It is certified that error appears in the above-identified patent and that said Letters Patent is hereby corrected as shown below:

In the Claims:

Column 14, line 58, Claim 2: before "sequence" insert -- a --.

Signed and Sealed this
Seventh Day of January, 2014

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,554,769 B1  
APPLICATION NO. : 12/486626  
DATED : October 8, 2013  
INVENTOR(S) : Thakur et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this
Third Day of March, 2015

Michelle K. Lee
*Deputy Director of the United States Patent and Trademark Office*